United States Patent
George

(10) Patent No.: US 6,473,139 B1
(45) Date of Patent: Oct. 29, 2002

(54) DATA ERROR RECOVERY FOR DIGITAL BEAM LANDING ERROR CORRECTION ARRANGEMENT

(75) Inventor: John Barrett George, Carmel, IN (US)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/409,491

(22) Filed: Sep. 30, 1999

(51) Int. Cl.[7] .................................................. H04N 9/28
(52) U.S. Cl. .................... 348/807; 348/806; 315/368.12
(58) Field of Search ................................. 348/805, 806, 348/807, 745, 747; 315/368.11, 368.12, 368.13, 368.24; H04N 3/22, 3/26, 3/223, 3/227, 5/68, 9/16, 9/28

(56) References Cited

U.S. PATENT DOCUMENTS

| | | | |
|---|---|---|---|
| 4,422,019 A | | 12/1983 | Meyer ........................ 315/368 |
| 4,635,117 A | | 1/1987 | Labb |
| 5,016,095 A | | 5/1991 | Kii .............................. 358/64 |
| 5,194,783 A | | 3/1993 | Ogino et al. ................ 315/368 |
| 5,282,033 A | | 1/1994 | Gleim et al. ................ 358/139 |
| 5,345,280 A | * | 9/1994 | Kimura et al. .............. 348/806 |
| 5,463,427 A | * | 10/1995 | Kawashima ................ 348/806 |
| 5,488,271 A | | 1/1996 | Gleim ........................ 315/370 |
| 5,671,025 A | * | 9/1997 | Ryu ........................... 348/745 |
| 6,014,168 A | * | 1/2000 | Webb et al. ................ 348/806 |
| 6,084,646 A | * | 7/2000 | Lee ............................ 348/806 |
| 6,097,447 A | * | 8/2000 | Kim et al. .................. 348/806 |
| 6,124,685 A | * | 9/2000 | Toriu et al. ................. 348/806 |
| 6,128,048 A | * | 10/2000 | Cho ............................ 348/807 |

FOREIGN PATENT DOCUMENTS

| | | |
|---|---|---|
| JP | 344514 | 12/1993 |

OTHER PUBLICATIONS

"A Fully Digital Convergence System for Projection TV" — M. Shiomi et al. Consumer Products Research Center Hitachi Ltd. Yokohama, 244, Japan—Manuscript received Jun. 8, 1990—1990 IEEE.

"Full Digital Convergence System for HDTV", T. Tsurumoto, Sony Corp., Tokyo, Japan –Manuscript received Jun. 7, 1991—1991 IEEE.

"A Real Time Digital Convergence System Using Interpolation" C.G. Oh et al. Dept. of Electronics Engineering, Seoul, Korea Visual Media Business, Samsung, Suwon, Korea—Manuscript Receive Jun. 10, 1996—1996 IEEE.

RCA 88554 Patent App. Ser. No. 822,155 filed Mar. 17, 1997 "Method fo obtaining signals in electronic devices by means of interpolation between interpolation point values" Gunter Gleim et al.

RCA 89556 Patent App. Ser. No. 343,730 filed Jun. 30, 1999 "Automated Calibration In A Projection Display Apparatus" Gunter Gleim.

* cited by examiner

Primary Examiner—John W. Miller
Assistant Examiner—Brian P. Yenke
(74) Attorney, Agent, or Firm—Joseph S. Tripoli; Harvey D. Fried; Sammy S. Henig

(57) ABSTRACT

In a video display, correction data for a digital convergence arrangement are stored in a first non-volatile memory. During power turn on procedure, the correction data are read out of and stored in a volatile memory. During each deflection cycle, the data stored in the volatile memory are successively read out and applied to an auxiliary convergence winding. When a parity error is detected in the read out data, the data stored in a second non-volatile memory are automatically read out and transferred to the volatile memory and to the first non-volatile memory. The second non-volatile memory contains a duplicate of the correction data stored in the first non-volatile memory, during factory set up. The data in the second non-volatile memory are maintained parity error free. Thereby the parity error containing data stored in the first non-volatile memory are substituted with the data that are free of parity error, provided by the second, non-volatile memory.

5 Claims, 1 Drawing Sheet

DATA ERROR RECOVERY FOR DIGITAL BEAM LANDING ERROR CORRECTION ARRANGEMENT

The invention relates to a beam landing correction arrangement in a video display apparatus.

BACKGROUND OF THE INVENTION

The displayed image in, for example, a direct view video display or in a projection video display having a cathode ray tube (CRT), may suffer from beam landing location errors such as geometrical and misconvergence errors. It is known to correct such errors for a CRT using a digital dynamic convergence arrangement. Correction data stored in a memory are applied via a digital-to-analog (D/A) converter and a power amplifier to, for example, an auxiliary convergence winding. The amount of correction may vary dynamically in a given deflection cycle, in accordance with the location of the beam on the display screen.

In a video display, embodying an inventive feature, correction data are stored in a first non-volatile memory that retains the correction data even when it is not energized. Upon power turn on, for example, the correction data stored in the non-volatile memory are read out and stored in a volatile memory. During each deflection cycle, the data stored in the volatile memory are successively read out and applied via a D/A converter to an auxiliary convergence winding;

whereas, the data from the non-volatile memory need not be read out during the deflection cycle. Because the data is retained in the non-volatile memory, the volatile memory need not retain the data when the video display is turned off. By using such memory hierarchy, the correction data is accessible via the faster volatile memory and is retained, when the display is turned off, using the slower, non-volatile memory.

At the factory, for example, factory adjusted correction data are stored in the non-volatile memory. The factory adjusted correction data are unique to each set of the same model to compensate for production tolerances. Re-adjustment of the correction data may be required after the set has been relocated to a geographical location having a different value of the earth magnetic field from that existed, during factory set up. The readjustment of the correction data may be obtained with an automatic alignment system using photo sensors.

Non-transient alteration of the correction data may occur in the non-volatile memory, as well as in the volatile memory, because of energy released in the event of a CRT arc discharge. The non-transient data alteration might occur when the arc discharge occurred simultaneously with the reading out of the correction data from the non-volatile memory. Whereas, no such data alteration has been observed when the data read out process and the arc discharge do not occur simultaneously. It may be desirable to substitute in each memory the data containing error with valid data free of data error.

In carrying out an inventive feature, each convergence data word includes a parity bit derived by check summing the data in the word that is read out of the volatile memory. The parity bit is used to sense data bit error in the read out data. A parity checking detector is used to calculate the parity bit using the present read out data bits from the volatile memory. When a parity error is detected, the data stored in a second non-volatile memory are automatically read out and transferred to the volatile memory and to the first non-volatile memory. The second non-volatile memory may contain a duplicate of the correction data stored in the first non-volatile memory, during factory set up.

Unlike the correction data in the first non-volatile memory, the data in the second non-volatile memory are parity error free. This is so because, the data are not read out from the second non-volatile memory, during power up procedure so read out and the release of arc discharge energy do not coincide. Thereby, advantageously, the parity error containing data stored in the first non-volatile memory are substituted with the data, provided by the second, non-volatile memory, that are free of parity error.

SUMMARY

A video display deflection apparatus, embodying an inventive feature which generates a deflection field in a cathode ray tube to vary a beam landing location of an electron beam of the cathode ray tube. A first memory space containing beam landing error correction data is provided. The correction data are read out of the first memory space, during a given deflection cycle. The correction data are applied to a deflection field generating arrangement for varying the deflection field by a variable amount that varies in accordance with the varying beam landing location. A second memory space containing beam landing error correction data is provided. The correction data are read out from the second memory space and stored in the first memory space, during a mode set up procedure. A third memory space containing beam landing error correction is provided. A bit error detector detects data bit error in the data stored in one of the first and second memory spaces. A controller is used for reading out beam landing error correction data of the third memory space and for storing the read out data of the third memory space in one of the first and second memory spaces. The data bit error containing data are replaced after the data bit error has been detected.

BRIEF DESCRIPTION OF THE DRAWING

The sole FIGURE illustrates, in a block diagram form, a deflection system of a projection television receiver, embodying an inventive feature.

DETAILED DESCRIPTION

Figure 1:
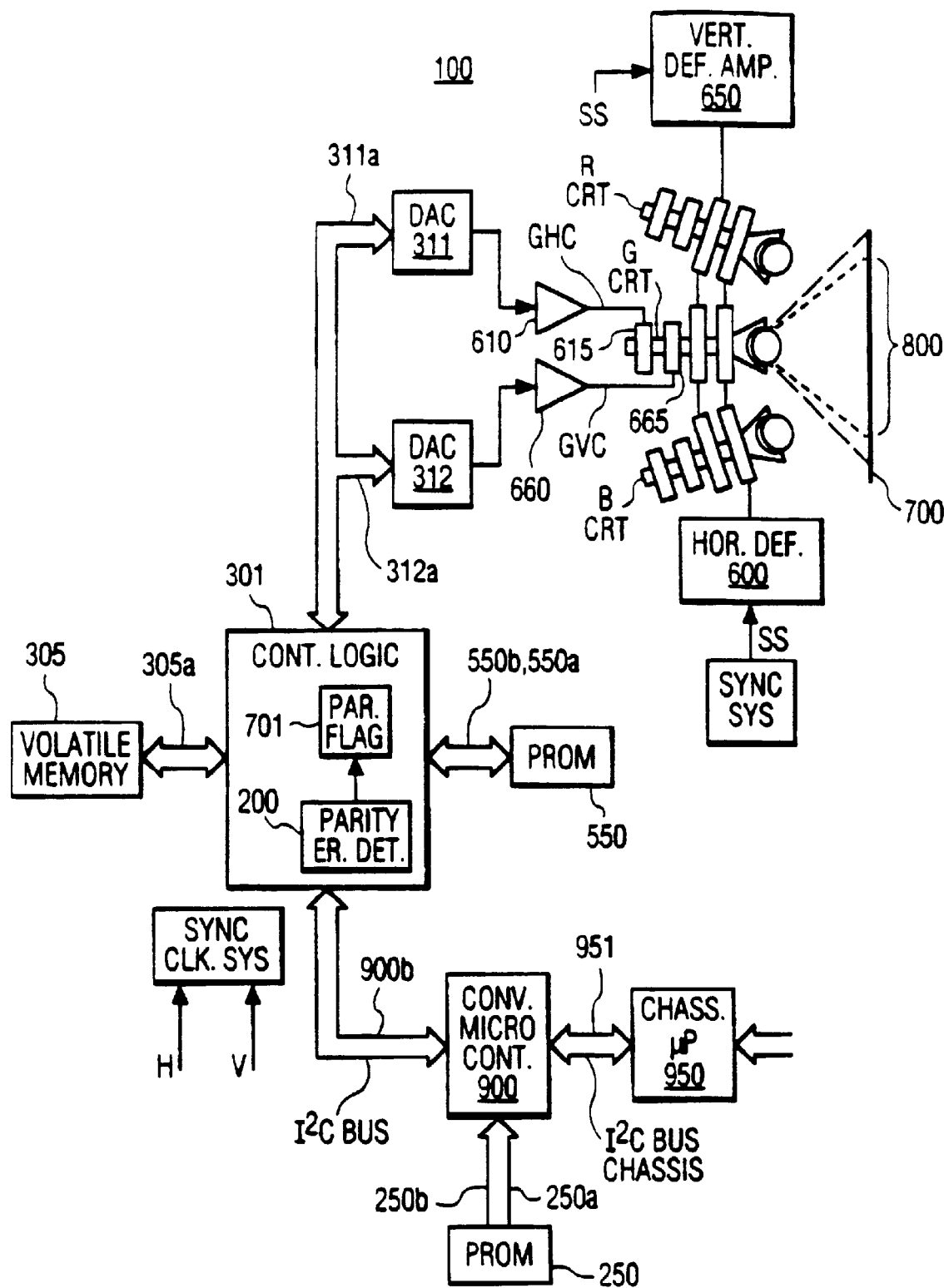

The sole FIGURE illustrates, in block diagram form, a deflection system 100 of a projection television receiver capable of multi-scan frequency operation. Deflection system 100 provides digital dynamic convergence, in accordance with an inventive feature. Three cathode ray tubes (CRT's), R, G and B form a combined image 800 on a screen 700. The deflection field in each CRT is controlled in a similar way. For example, CRT G is equipped with a horizontal deflection coil driven by a horizontal deflection output stage 600 and with a vertical deflection coil driven by a vertical deflection amplifier 650, conventionally constructed. CRT G is also depicted with an auxiliary horizontal convergence coil 615 driven by a horizontal convergence amplifier 610 and with an auxiliary vertical convergence coil 665 driven by a vertical convergence amplifier 660, conventionally constructed. An digital-to-analog (D/A) converter 311 is coupled to amplifier 610 and drives it with an analog signal derived from a digital beam landing error correction data word 311*a* Similarly, a D/A converter 312 is coupled to amplifier 660 and drives it with an analog signal derived from a digital beam landing error correction data word 312*a*.

During the deflection cycle, Words 311*a* and words 312*a* are read out of a memory 305 via a controller or control logic circuit 301, in a conventional manner. Memory 305 forming a volatile memory space has a sufficiently fast access time for fetching successive words as the beam landing location varies on screen 700 to provide for dynamic convergence.

An electrically erasable programmable memory (EEPROM) 550 forming a first non-volatile memory space and containing digital beam landing error correction data words 550a is coupled to control logic circuit 301 via a bus 55b. Memory 550 includes, for example, four 2K byte memory spaces, not shown, for providing words 311a and 312a. The four 2K byte memory spaces are used, when stage 600 operates in a selectable horizontal scan frequency, 1H, 2H, 2.14H or 2.4H, respectively, where H is equal to 15,734 Hz.

During a mode set up occurring as part of a power up procedure or when a change of, for example, a horizontal scan frequency in horizontal deflection output stage 600 is required, data words 550a are read out of memory 550, and transferred via logic circuit 301 to memory 305. Thus, the duplicates of data words 550a are stored in memory 305. Thereafter, memory 305 contains the required values of digital beam landing error correction data words 311a and 312a for providing dynamic convergence, as explained before.

A convergence microprocessor 900 is coupled via an I²C bus 900b isolated from bus 550b and mastered by microprocessor 900. Microprocessor 900 controls logic circuit 301 for providing required control and data transfer functions associated with control logic circuit 301.

A back-up, non-volatile EEPROM 250 forming a second non-volatile memory space and containing factory adjusted digital beam landing error correction data words 250a is coupled to convergence microprocessor 900 via a bus 250b that is, advantageously, isolated from each of bus 550b and bus 900b. Data words 250a can be read out of EEPROM 250, transferred via microprocessor 900 and logic circuit 301 to memory 305 and, their duplicates stored in memory 550. Convergence microprocessor 900 is controlled by a main chassis microprocessor 950 via an I²C bus 951 that additionally serves various receiver sub systems.

In a factory set up procedure, screen 700 is viewed by a camera, not shown. Convergence error correction data words are stored in memory 305 and are adjusted until the displayed image meets tight screen position specifications. Duplicates of the data in memory 305 are then written to each of EEPROMs 550 and 250.

During CRT G arc discharge, non-transient alteration of correction data words 550a might occur in memory 550 because of the energy released in the arc discharge. Alteration of the correction data words might occur also in memory 305. The data alteration in memory 550 seemed to happen intermittently when the arc discharge and the read out of the correction data words 550a from memory 550 occur simultaneously. Whereas, no data alteration has occurred when, during the occurrence of the arc discharge, data words are not simultaneously read out from memory 550. A data error correction procedure, embodying an inventive feature, is employed for substituting the error containing data in memory 550 with data free of errors.

Each convergence data word 311a and 312a read out of memory 305 has a parity bit, not shown, derived by check summing the data in the word that are read out from memory 305, during, for example, factory set up. These parity bits are used to sense a data error in each of read out data words 311a and 312a. A parity checking detector 200 is used to calculate the parity bits using the present read out data words 311a and 312a from memory 305. When a parity error is detected, a parity flag bit 701 is set in logic circuit 301. Flag bit 701 is monitored by convergence microprocessor 900. Chassis microprocessor 950 checks the status of flag bit 701 via microprocessor 900, for example, every 5 seconds.

If flag bit 701 has been set, because of detected parity bit error, data words 250a stored in memory 250 are automatically read out and transferred to memory 305. Data words 250a in memory 250 are parity error free because, during the aforementioned arc discharge, no read out process occurs simultaneously in memory 250. Thus, updated data words 311a and 312a in memory 305 are identical to those obtained, during factory set up. As a result, advantageously, a more acceptable image quality on screen 700 is obtained. Thereafter, duplicate data words to those stored in memory 250 are transferred to memory 550. As a result, data words 550a in memory 550 also become parity error free.

Re-adjustment of correction data words 550a in memory 550 may be required, for example, after the set has been relocated to a geographical location having a different value of the earth magnetic field from which existed, during factory set up. An alignment procedure may be employed when the set is serviced, during field service, or under user control for re-adjusting the data stored in memory 550. Advantageously, the words stored in memory 250 are used both for running the alignment procedure and for producing error free correction data words 550a in memory 550, as explained before.

What is claimed is:

1. A video display deflection apparatus, comprising:
   means for generating a deflection field in a cathode ray tube to vary a beam landing location of an electron beam of said cathode ray tube;
   a first memory space containing beam landing error correction data that are read out of said first memory space, during a given deflection cycle, and applied to said deflection field generating means for varying said deflection field by a variable amount that varies in accordance with said varying beam landing location;
   a second memory space containing beam landing error correction data that are read out from said second memory space and stored in said first memory space, during a mode set up procedure;
   a third memory space containing beam landing error correction data;
   a bit error detector for detecting data bit error in the data stored in one of
   said first and second memory spaces; and
   a controller for reading out said beam landing error correction data of said third memory space and for storing said read out data of said third memory space in one of said first and second memory spaces to replace said data bit error containing data, after said data bit error has been detected.

2. A video display deflection apparatus according to claim 1, wherein, after said data bit error has been detected, the data in said third memory space are read out of said third memory space and stored in said second memory space to replace said data bit error containing data in said second memory space with data that is free of data bit error.

3. A video display deflection apparatus according to claim 1, wherein said data bit error is produced in the data stored in said second memory space, during said mode set up procedure, when said data are read out from said second memory space and stored in said first memory space.

4. A video display deflection apparatus according to claim 1, wherein each of said second and third memory spaces is contained in a non volatile memory.

5. A video display deflection apparatus according to claim 1, wherein the data stored in said first memory space are used for correcting convergence errors.

* * * * *